March 20, 1945.      E. A. ROCKWELL      2,372,013
AMPLIFYING FLUID PRESSURE DEVICE
Original Filed Nov. 19, 1938
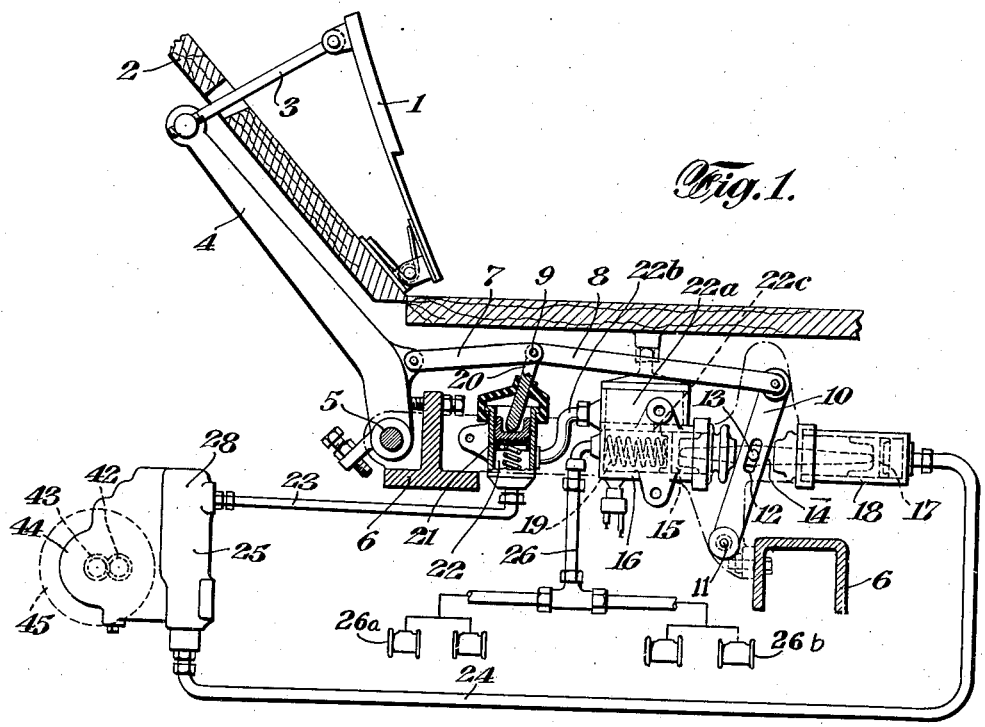
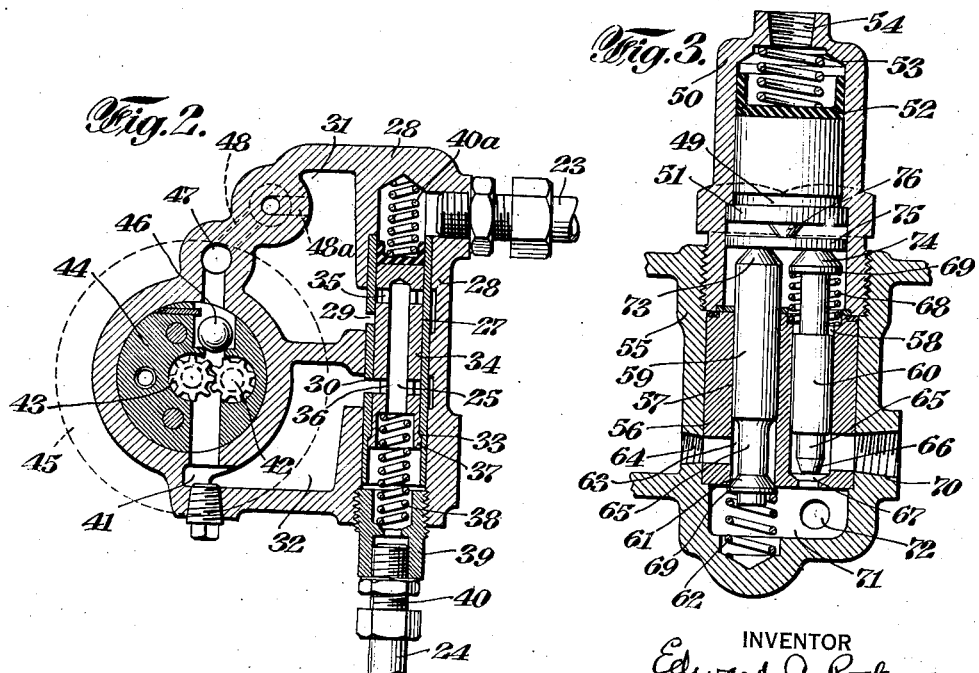
INVENTOR
Edward A. Rockwell
BY
Arthur Wright
ATTORNEY Patented Mar. 20, 1945

2,372,013

UNITED STATES PATENT OFFICE 2,372,013

AMPLIFYING FLUID PRESSURE DEVICE

Edward A. Rockwell, West Hartford, Conn., assignor to General Auto Parts Corporation, a corporation of Delaware Application November 19, 1938, Serial No. 241,313, which is a division of application Serial No. 726,426, May 18, 1934, now Patent No. 2,163,764, dated June 27, 1939. Divided and this application July 3, 1940, Serial No. 343,755

18 Claims. (Cl. 188—152)

My invention relates particularly to an apparatus designed for amplifying power but which has application especially for the operation of automotive accessories, as for example automobile brakes.

This application is a division of my application upon Valve mechanism, Ser. No. 241,313, filed November 19, 1938, which is a division of my application upon Fluid pressure amplifying device, Ser. No. 726,426, filed May 18, 1934, Patent No. 2,163,764, granted June 27, 1939.

The object of my invention is to provide an apparatus by which the work performed in causing the actuation of the device is amplified by the actuation thereof. Another object is the provision of an apparatus of the above character which is adapted to control the actuation of automotive accessories. Further objects of my invention will appear from the detailed description of the same hereinafter.

While my invention is capable of being carried out in many different ways, for the purpose of illustration I have shown only certain embodiments of the same in the accompanying drawing, in which—

Fig. 1 is a side elevation of a valve system made in accordance with my invention;

Fig. 2 is a vertical section through the valve for controlling the application of power; and Fig. 3 is a vertical section through a modified form of control valve.

Referring to the drawing, I have shown a foot pedal 1 mounted on a floor-board 2 of an automobile and connected by a link 3 to a lever 4 carried on a shaft 5 secured to the frame 6 of the automobile. Pull links 7 and 8 angularly pivoted together at 9 connect the lever 4 with a second lever 10 which swings on a stationary pin 11 carried by the automobile frame 6. A slot 12 in the lever 10 engages a pin 13 fixed in a rod 14 disposed between a piston 15 of a motor device comprising master brake cylinder 16 and a piston 17 of a booster cylinder 18. A compression spring 19 urges the piston 15 outwardly. A push-rod 20 is located between the pivot 9 and a piston 21 in a reaction master cylinder 22. There is also provided a compensating liquid supply reservoir 22a constituting an unloading chamber having a port 22c leading to the cylinder 16 and a pipe 22b leading to the reservoir 22a. Control and high pressure tubes 23 and 24, respectively, connect the reaction cylinder 22 and the booster cylinder 18 with a control valve 25. A fluid line 26 leads from the master cylinder 16 to the brakes of the automobile, having front wheel brake cylinders 26a and rear wheel brake cylinders 26b.

The valve 25 is constructed in the following manner. A sleeve 27 is tightly held within a casing 28 and is provided with slots 29 and 30 in communication with high and low pressure chambers 31 and 32, respectively. The sleeve 27 is provided with an upper internal shoulder 33, and a hollow piston 34, slidable within the sleeve 27, is provided with lateral ports 35 and 36 adapted to register with the slots 29 and 30 respectively. The piston 34, furthermore, is formed with a bottom flange 37 and is urged upwardly by a spring 38 backed by a bushing 39 threaded into the casing 28. The bushing 39 receives a fitting 40 for connecting thereto the pressure supply line 24. A spring 40a at the top of the piston 34 controls its upward movement. The low pressure chamber 32 leads by a passageway 41 to gear pump gears 42 and 43 in a gear pump 44. The gears 42 and 43 may be driven from any suitable source of power in any desired way but, for example, may be driven by an electric motor 45 on the shaft of the gear 43 and which may be started and stopped in any desired way, designed to maintain a uniform pressure in the high pressure chamber 31, which is connected to the delivery side of the gear pump 44 through a ball check valve 46 and passageways 47, 48 and 48a.

The alternative form of valve shown in Fig. 3 employs an actuating piston 49 of relatively large diameter, slidable in a cylinder 50 and having a stop flange 51 to define its upper position. The usual sealing washer 52 and follower spring 53 are disposed above the piston 49 and an upper threaded hole 54 is provided in the cylinder 50 for a tube connection to a source of modulating pressure, such as the reaction cylinder 22, by the pipe 23. The cylinder 50 is screwed into a body 55 and clamps therein a plug 56 having vertical holes 57 and 58, in which are slidable a high pressure valve plunger 59 and a low pressure valve plunger 60, respectively. The plunger 59 has a conical head 61 normally seated against the lower end of the hole 57 by a strong compression spring 62 and is necked above the head 61 to leave an annular space 63 in the hole 57. A high pressure inlet 64 opens into the annular space 63. The low pressure plunger 60 has a lower reduced portion 65 terminating in a cone 66 adapted to engage a seat 67 of relatively small diameter in the bottom of the hole 58. A relatively light spring 68 under a head 69 on the plunger 60 normally holds the latter up so that the cone 66 is spaced from the seat 67. The numeral 70 indicates a threaded lower pressure passage, opening out of the hole 58 near the bottom thereof. The plug 56 and body 55 overlie a modulated pressure chamber 71 having an outlet 72. The plungers 59 and 60 have conical upper ends 73 and 74 engaging a disc 75 which centrally engages a conical nose 76 on the bottom of the piston 49.

The operation in Figs. 1 and 2 is as follows: Assuming the hydraulic system to be initially filled with liquid and the electric motor 45 to have been operated until its circuit is broken, due to obtaining the desired pressure within the high pressure cylinder 31 by drawing the hydraulic fluid from the low pressure chamber 32, if it is desired to apply the brakes the foot pedal 1 is moved downwardly, thereby moving the piston 15 which acts together with the levers 10, 8 and 7 as a position-coordinating means and forcing the hydraulic fluid manually through the pipe system 26 to the automobile brakes. At the same time movement of the pull links 7 and 8 will cause the downward movement of the push-rod 20 so as to force the modulated hydraulic fluid, according to the amount of pressure applied by the foot, through the control pipe 23 and thence to the top of the piston 34, forcing the same downwardly so as to close the low pressure port 36 and open the high pressure port 35, so that as a result the high pressure fluid passes through the line 24 into the booster cylinder 17 to thus boost the pressure in the pipe line 26. In this action of the manual means, there is applied to the hollow piston or movable member 34 as a maximum the force derived hydraulically from the manually movable means including the pedal 1. This boosting effect, of course, cooperates with the manual pressure from the pedal 1, but does not of itself appreciably change the position of the valve means, as, owing to the angularity of the links 7 and 8 the downward movement of the piston 21 can be brought about only by a pull on the link 7 due to pressing downwardly on the pedal 1. As pressure builds up in the pipe 24 it reacts by moving the pedal 1 slightly upwardly on the valve 34, moving the same upwardly and holding the pressure constant in said pipe 24, unless the manually applied pressure on the piston valve 34 is changed. Upon release of the foot pressure, the piston valve 34 rises to close the high pressure port 35 and open the low pressure port 36, thus releasing the high pressure liquid from the booster 18 through the pipe 24 and releasing the manual pressure on the fluid in the pipe 23 and the cylinder 22, which then communicates with the tank 22a by the pipe 22b, in the released position of the piston 21 for liquid compensation. Thus, in the retracted position of the piston 15, the cylinders 22 and 16 communicate with the same liquid reservoir 22a for the free transfer of liquid between the said cylinders 22 and 16 and the reservoir 22a. This restores the phase relation, therefore, between the pistons 21 and 15 at the end of the brake actuation and before the start of a new actuation of the pistons 21 and 15 by the pedal 1. Likewise, there is an accurate position coordination between the travel of the pedal 1 and the movement of the piston 15, owing to the linkage 7 and 8 and the lever 10 which connect the pedal 1 to the piston 15, so that as the piston 15 advances there is a position coordinating or coordination of travel between the said piston 15 and the pedal 1. In the operation of my apparatus, accordingly, there is not only an accurate "feel" on the pedal 1, due to the reaction from the power applied to the column of liquid in the pipes 23 and 24 from the pistons 17 and 15, but there is also a coordination of the travel of said pistons 17 and 15 with the travel of the pedal 1.

The modification of the invention shown in Fig. 3 operates in a similar manner. Accordingly, when pressure is applied above the piston 49 through the hole 54 the conical nose 76 presses down on the disk 75. The spring 62 being stronger than the spring 68 the latter yields and the disk 75 rocks downwardly on the conical upper end 73 of the plunger 59 as a fulcrum, forcing the plunger 60 downwardly until the cone 66 closes against the seat 67, and thereby shuts off the low pressure communication from the chamber 71 to the passage 70. As additional pressure is applied to the piston 49, the disc 75 rocks downwardly on the conical upper end 74 of the plunger 60 as a fulcrum, overcoming the spring 62 and forcing the conical head 61 away from its seat, thereby admitting high pressure fluid from the inlet 64 to the chamber 71 and thence through the outlet 72 to the device to be actuated. As pressure builds up in the chamber 71 it reacts, by moving the pedal 1 slightly upwardly, on the bottom of the head 61, moving the latter up against its seat in opposition to the piston 49 and holding the pressure constant in the chamber 71 unless the applied pressure on the piston 49 is changed. If additional pressure is applied to the piston 49 a corresponding increase of pressure is caused in the chamber 71. If the pressure from the pedal 1 against the piston 49 is then lowered the force urging the plunger 60 downwardly is decreased and the pressure in the chamber 71 against the lower end of the plunger 60 raises the latter, allowing pressure to exhaust from the chamber 71 through the passage 70. From the above description it will be noted that in its functioning the alternative valve follows substantially the operation of the type previously described and gives the same modulation effect.

While I have described my invention above in detail I wish it to be understood that many changes may be made therein without departing from the spirit of the same.

I claim:

1. In combination, a device adapted to be moved to perform work, a manual follow-through actuator directly connected therewith, and a power operated means adapted to move said device, comprising a source of pressure differing from the atmospheric pressure, a rigidly mounted valve chamber to maintain a given pressure derived from said source of pressure, a valve plunger associated therewith having operating means, including a master cylinder, connecting the valve plunger to the manual actuator, and a valve means including an inlet valve and a relief valve associated with said plunger adapted to control the entrance and exit of said pressure to said valve chamber by the pressure exerted on said valve means, the said last mentioned connecting means which connects the valve plunger to the manual actuator being moved according to the reaction pressure on the said valve means, and the power-operated means and master cylinder having a common unloading chamber.

2. In combination, a part of an automotive vehicle adapted to be moved for the control of the latter and a fluid pressure means for moving said part, comprising a source of fluid pressure differing from atmospheric pressure, a plunger valve for maintaining a given pressure to control the operation of said fluid pressure means, a movable wall moved by said fluid pressure, a hydraulic line from said wall to said part, manually movable means adapted to apply a manual force to said part, including a fluid pressure connection to the plunger valve, so constructed as to apply to said valve as a maximum the fluid pressure derived from the manually movable means in the actuation of said part and a hydraulic connection providing a communication from said hydraulic line to said fluid pressure connection.

3. In combination, a part of an automotive vehicle adapted to be moved for the control of the latter and a hydraulic means for moving said part, comprising a source of fluid pressure differing from atmospheric pressure, a plunger valve for maintaining a given pressure to control the operation of said hydraulic means, a movable wall moved by said fluid pressure, a hydraulic line from said wall to said part, a manually movable means, including a hydraulic connection to the plunger valve, so constructed as to apply to said valve as a maximum the fluid pressure derived from the manually movable means in the actuation of the said part and a hydraulic connection providing a communication from said hydraulic line to said fluid pressure connection.

4. In combination, a part of an automotive vehicle adapted to be moved for the control of the latter and a hydraulic means for moving said part, comprising a source of fluid pressure differing from atmospheric pressure, a plunger valve adapted to admit said fluid pressure for maintaining a given pressure to control the operation of said hydraulic means, a movable wall moved by said fluid pressure, a hydraulic line from said wall to said part, a manually movable means, including a hydraulic connection to the plunger valve, so constructed as to apply to said valve as a maximum the fluid pressure derived from the manually movable means in the actuation of the said part, said plunger valve being adapted, by the admission of the fluid pressure, to increase the force applied by said manually movable means and a hydraulic connection providing a communication from said hydraulic line to said fluid pressure connection.

5. In combination, a part of an automotive vehicle adapted to be moved for the control of the latter and a fluid pressure means for moving said part comprising means for producing fluid pressure differing from the atmospheric pressure, a movable member adapted to control the application of the fluid pressure means, a movable wall moved by said fluid pressure, a hydraulic line from said wall to said part, manually movable means adapted to apply manual force to said part and having a connection to the movable member for the actuation of the said part by the means for producing fluid pressure, said manually movable means being so constructed as to apply to said movable member as a maximum a force derived from the manually movable means and a hydraulic connection providing a communication from said hydraulic line to said movable member.

6. A system for operating booster brake mechanism including a foot pedal, a cylinder having a piston connected with the foot pedal for creating liquid pressure in the system upon depression of the pedal, a motor device fed with pressure liquid to apply the booster, and a variable volume device which comprises a cylinder and piston unit hydraulically connected with the pressure creating means and connected with the motor device, said variable volume device being actuated mechanically by the booster so that as the latter comes into operation, the volume of the variable volume device increases, the liquid required to fill the increased volume being withdrawn from the system, thereby reducing the liquid pressure in the motor unit, said first mentioned cylinder and variable volume device cylinder each having a liquid compensation port communicating with each other closed by its piston in the forward position thereof and opened in the rearward position thereof.

7. In a braking system, hydraulic brake operating means including a master cylinder, a brake pedal, connecting means connecting the pedal and the master cylinder, a fluid pressure creating device connected to the connecting means and associated therewith to be operated thereby, a power device connected to said connecting means to act on said master cylinder, and means operable initially by said connecting means for controlling the power device including an element responsive to the pressure in the pressure creating means for actuating the controlling means, said controlling means being constructed and arranged to react on the brake pedal in proportion to the effective power of the power device.

8. In a braking system, brake operating means including a master cylinder, a brake pedal, connecting means connecting the pedal and the brake operating means, a fluid pressure creating device connected to the connecting means and associated therewith to be operated thereby, a power device for creating fluid pressure in the master cylinder, means operable initially by said connecting means for controlling the power device including an element responsive to the pressure in the pressure creating means for actuating the controlling means, and means responsive to the brake applying force exerted by said power device arranged to resist actuation of the control means.

9. In a braking system, brake operating means including a master cylinder, a brake pedal, connecting means operatively connecting the pedal and the brake operating means, a fluid pressure creating device connected to the connecting means and associated therewith to be operated thereby, said connecting means also including a power device for exerting pressure on fluid in the master cylinder, and means operable initially by said connecting means for controlling the power device including an element responsive to the pressure in the pressure creating means for actuating the controlling means, the effective area of the pressure creating device being substantially greater than the effective area of said element.

10. In a braking system, brake operating means including a master cylinder, a brake pedal, connecting means connecting the pedal and the brake operating means, a fluid pressure creating device connected to the connecting means and associated therewith to be operated thereby, a power device for exerting brake applying pressure on fluid in the master cylinder, means operable initially by said connecting means for controlling the power device including an element responsive to the pressure in the creating means for actuating the controlling means, and means responsive to the brake applying force exerted by said power device arranged to resist actuation of the control means, the effective area of the pressure creating device being substantially greater than the effective area of said element.

11. A brake system for automotive vehicles comprising brakes, hydraulic means for applying the brakes having a hydraulic cylinder and piston, power means for actuating the hydraulic means, a manually controllable member for controlling the power means to cause application of the brakes, and means including a hydraulic cylinder and piston for opposing the brake applying movements of the manually controllable member with a force proportional to the brake applying force being exerted by the hydraulic means said hydraulic cylinders having ports connected to each other in the retracted positions of the pistons.

12. In a device of the character described, the combination of a manual actuating means including a pedal and a lever, a source of pressure different from the atmospheric pressure to provide power, a part adapted to be moved by the said power for the performance of work under the control of said lever, a hydraulic connection leading from the lever, a valve device connected to said hydraulic connection operable initially by the lever adapted to control the application of said power to the part to be moved and a fluid connection to the part to be moved arranged to receive fluid pressure from said source of pressure according to the control thereof by said device, the manual actuating means having a direct connection for the operation of said part irrespective of said power and being subject to reaction pressures from the valve device according to the power pressures applied to the part to be moved.

13. In a braking system, hydraulic brake actuating means including a master cylinder, a brake pedal, connecting means operatively connecting the pedal and the master cylinder, a fluid pressure creating device associated therewith, said pressure creating device having an operative connection controlled by said connecting means, a differential fluid pressure power device for operating brakes, and a valve for controlling said device actuated by the pressure in the fluid pressure creating device and reacting on the pedal through the medium of the pressure creating device in proportion to pressure in the differential pressure device.

14. In a braking system, hydraulic brake actuating means including a master cylinder, a brake pedal, connecting means operatively connecting the pedal and the master cylinder, a fluid pressure creating device associated therewith, said pressure creating device having an operative connection controlled by said connecting means, a fluid power cylinder for operating brakes, and a valve for controlling said cylinder actuated by the pressure in the fluid pressure creating device, said valve having means reacting through the fluid pressure creating device on the brake pedal in proportion to the degree of fluid pressure in said power cylinder.

15. In a braking system, a brake pedal, brake actuating means including a master cylinder, a differential fluid pressure power device for exerting pressure on the fluid in the said master cylinder, a valve for controlling said power device, and connecting means operatively connecting the pedal and the brake actuating means, a fluid pressure creating device associated therewith adapted to actuate the valve, said pressure creating device having an operative connection controlled by said connecting means, said valve including an element responsive to the differential fluid pressure applied to the power device constructed and arranged to react on the fluid in the fluid pressure creating device.

16. In combination, a manual means for the control of an automotive vehicle, a work-performing element, and a hydraulic pressure means for moving the same, comprising a hydraulically operated valve, the positions of which are independent of the positions of the work-performing element, a hydraulic connection from said manual means to said valve adapted to apply pressure for operating the valve in one direction, having a hydraulic connection providing a communication from the said first mentioned hydraulic connection to said element, and a connection from said manual means to the element for applying a force allowing the valve to move in another direction towards the release of said valve.

17. In combination, a device adapted to be moved to perform work, a manual follow-through hydraulic actuator directly connected therewith having a stationary cylinder and a piston therein, and a hydraulic power-operated means controlled by said manual actuator piston adapted to move said device, comprising a source of pressure differing from the atmosphere, a rigidly mounted valve chamber adapted to maintain a given pressure derived therefrom, a valve plunger associated therewith operated by the manual actuator, a modulating valve means associated with said plunger, adapted to control the entrance and exit of said pressure to said valve chamber by the pressure exerted on said valve means, the said manual actuator while being moved, being subjected to the reaction pressures exerted through said valve means from the power applied to said device.

18. In a braking system, a hydraulic brake actuating means including a master cylinder having a piston reciprocable therein, a brake pedal, means operatively connecting the pedal and the master cylinder piston, a fluid pressure creating device associated with the connecting means and having a stationary hydraulic cylinder and a second piston therein, a differential fluid pressure power device for exerting a force on the master cylinder piston, a motor for applying power to said power device actuated by pressure in the fluid pressure creating device, and means for causing a reaction on the pedal through the medium of the pressure creating device in proportion to the pressure in the differential fluid pressure power device.

EDWARD A. ROCKWELL.

Certificate of Correction

Patent No. 2,372,013.                                                                                   March 20, 1945.

EDWARD A. ROCKWELL

It is hereby certified that error appears in the above numbered patent requiring correction as follows: In the heading to the drawing, line 3, for "Nov. 19, 1938" read *May 18, 1934*; and that the said Letters Patent should be read with this correction therein that the same may conform to the record of the case in the Patent Office.

Signed and sealed this 23d day of April, A. D. 1946.

[SEAL]

LESLIE FRAZER,
*First Assistant Commissioner of Patents.*